United States Patent Office
3,135,753
Patented June 2, 1964

3,135,753
ALKYLTHIOPURINES AND METHOD
George H. Hitchings, Tuckahoe, and Gertrude B. Elion, Bronxville, N.Y., assignors to Burroughs Wellcome & Co. (U.S.A.) Inc., Tuckahoe, N.Y., a corporation of New York
No Drawing. Filed May 10, 1961, Ser. No. 108,986
4 Claims. (Cl. 260—252)

This application relates to a new group of alkylthiopurines which have valuable properties in medicine as described below. These new compounds can be represented by the following Formula 1:

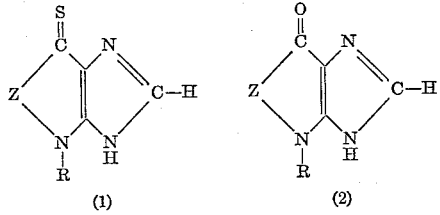

wherein R is a lower alkyl group and Z is a bivalent radical selected from the class consisting of

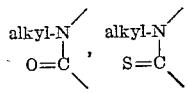

and

These new compositions of matter may be prepared from the corresponding oxygen compounds of Formula 2 by treatment with phosphorus pentasulfide in an inert solvent at an elevated temperature but at a temperature substantially below the decomposition point of the starting material and product.

This application is a continuation-in-part of application 663,912 filed June 6, 1957, now abandoned.

These new compositions are valuable medicaments and in particular are useful because of their ability to increase the blood flow in the coronary vessels, to improve the circulation in the heart muscle and to relieve the symptoms of angina pectori. In this regard, they are notably superior to other methylated purines which heretofore had been used in medicine for this purpose. This can be illustrated and measured by their effects on isolated heart preparation known as the Langendorff preparation. This is illustrated in the table below wherein three of the compounds of this application have been subjected to measurements on the Langendorff heart preparation in comparison with aminophylline. The coronary flow index is the product of both flow and potency, i.e. if a drug doubled the flow over what was given by aminophylline and at one half the dose of the latter, the value of the index would be 4. The following examples serve to illustrate the invention, however, its scope is defined in the claims.

| Example | Compound | Coronary Flow Index |
|---|---|---|
|   | Aminophlline | 1 |
| 1 | 3-Methyl-6-purinethione | 5 |
| 5 | 3-Methyl-2,6-purinedithione | 4 |
| 2 | 1,3-Dimethyl-2,6-purinedithione | 4 |

EXAMPLE 1

3-Methyl-6-Purinethione

A mixture of 4.3 g. of 3-methylhypoxanthine, 12 g. of powdered phosphorus pentasulfide and 100 ml. of dry pyridine was heated under reflux conditions for 2½ hours. The pyridine was removed under reduced pressure and the solid residue heated with 200 ml. of water for 20 minutes. After chilling, the crude 3-methyl-6-purinethione was collected (3.25 g.). After recrystallization from water the product melted at 322–323° dec. The ultraviolet absorption spectrum showed maxima at 242 and 335 m$\mu$ at pH 1, 242 and 333 m$\mu$ at pH 11.

EXAMPLE 2

2,6-Dithiotheophylline

A mixture of 10 g. of theophylline (1,3-dimethylxanthine), 50 g. of powdered phosphorus pentasulfide and 150 ml. of tetralin was heated for 5 hours at 190° with mechanical stirring. The mixture was cooled, filtered and the insoluble residue washed with benzene and petroleum ether. The residue was boiled with 750 ml. of water for 20 minutes and then chilled and filtered. The insoluble material was treated with 300 ml. of 0.2 N sodium hydroxide, filtered and the filtrate acidified with acetic acid to pH 5. The yellow precipitate of 2,6-dithiotheophylline (5.2 g.), after recrystallization from 95% ethanol melted at 252–254° dec. Its ultraviolet absorption spectrum showed maxima at 252, 297 and 345 m$\mu$ at pH 1 and at 265, 295 and 345 m$\mu$ at pH 11.

EXAMPLE 3

6-Thiotheophylline

A mixture of 5 g. of theophylline, 15 g. of powdered phosphorus pentasulfide and 150 ml. of dry pyridine was heated under reflux conditions for 2 hours. The pyridine was removed by distillation and the residue boiled with 200 ml. of water and chilled. The insoluble material was collected, treated with 20 ml. of 2 N sodium hydroxide and 200 ml. of water and filtered. The filtrate was acidified with acetic acid to pH 5 and the crystalline precipitate of 6-thiotheophylline (3.5 g.) collected. After recrystallization from 95% ethanol, the pale yellow crystals melted at 315–317° dec. The ultraviolet absorption spectrum of the product showed maxima at 270 and 342 m$\mu$ at pH 1 and at 260 and 340 m$\mu$ at pH 11.

EXAMPLE 4

3-Methyl-2-Oxo-6-Mercaptopurine

A mixture of 1 g. of 3-methylxanthine, 5 g. of powdered phosphorus pentasulfide and 50 ml. of dry pyridine was heated under reflux conditions for 3 hours. The pyridine was removed under reduced pressure and the residue boiled with 100 ml. of water for 15 minutes. The hot solution was filtered and chilled whereupon it deposited 0.7 g. of 3-methyl-2-oxo-6-mercaptopurine. After recrystallization from water, the product decomposes at about 320°. Its ultraviolet absorption spectrum shows maxima at 345 m$\mu$ at pH 1 and 337 m$\mu$ at pH 11.

EXAMPLE 5

3-Methyl-2,6-Dithioxanthine

A mixture of 5.6 g. of 3-methyl-2-thioxanthine, 20 g. of powdered phosphorus pentasulfide and 250 ml. of dry pyridine was heated under reflux conditions. The mixture was evaporated to dryness under reduced pressure and the residue heated with 300 ml. of water for 20 minutes and chilled. The crude precipitate was dissolved in 300 ml. of water containing 20 ml. of concentrated ammonium hydroxide and filtered. Upon acidification to pH 4 with concentrated hydrochloric acid, the 3-methyl-2,6-dithioxanthine precipitated (3.2 g.). It did not melt below 340°. The ultraviolet absorption spectrum showed maxima at 254, 298 and 352 mμ at pH 1 and at 257, 302 and 342 mμ at pH 11.

What we claim is:
1. Compounds of the formula

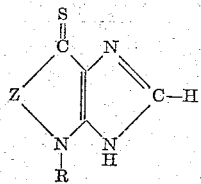

wherein R is a lower alkyl group and Z is a bivalent radical selected from the class consisting of

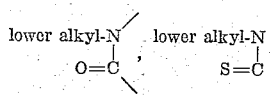

and

2. 3-methyl-6-purinethione.
3. 2,6-dithiotheophylline.
4. 3-methyl-2,6-dithioxanthine.

References Cited in the file of this patent
UNITED STATES PATENTS
2,697,709    Hitchings et al. _____ Dec. 21, 1954
FOREIGN PATENTS
100,875    Germany _____ Nov. 30, 1898
OTHER REFERENCES
Fieser et al.: Organic Chemistry, pp. 220–227, 2nd ed. (1950).

UNITED STATES PATENT OFFICE
CERTIFICATE OF CORRECTION

Patent No. 3,135,753            June 2, 1964

George H. Hitchings et al.

It is hereby certified that error appears in the above numbered patent requiring correction and that the said Letters Patent should read as corrected below.

Column 3, claim 1, lines 15 to 18 should appear as shown below instead of as in the patent:

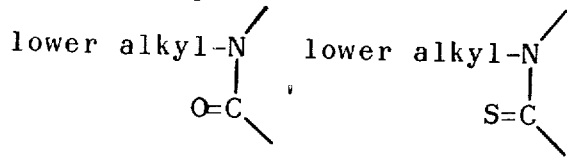

Signed and sealed this 29th day of September 1964.

(SEAL)
Attest:

ERNEST W. SWIDER
Attesting Officer

EDWARD J. BRENNER
Commissioner of Patents